United States Patent [19]
Wood

[11] Patent Number: 5,409,561
[45] Date of Patent: Apr. 25, 1995

[54] LINING OF PASSAGEWAYS

[75] Inventor: Eric Wood, Castletown, United Kingdom

[73] Assignee: Insituform (Netherlands) B.V., Rotterdam, Netherlands

[21] Appl. No.: 50,265

[22] Filed: Jul. 6, 1993

[30] Foreign Application Priority Data

Nov. 8, 1990 [GB] United Kingdom ............... 9024274

[51] Int. Cl.⁶ ..................... B29C 63/36; B29C 63/48
[52] U.S. Cl. ..................................... 156/287; 138/97;
156/294; 264/269; 264/573; 427/236; 427/238
[58] Field of Search ................. 156/156, 287, 294;
264/269, 270, 516, 573; 138/97; 118/306, DIG.
10; 427/236, 238, 427

[56] References Cited

U.S. PATENT DOCUMENTS

| 2,513,289 | 7/1950 | Crom | 264/270 |
| 3,087,515 | 4/1963 | Venable et al. | 264/270 |
| 3,960,644 | 6/1976 | McFadden | 156/390 |
| 4,064,211 | 12/1977 | Wood | 156/287 |
| 4,401,696 | 8/1983 | Wood | 427/238 |
| 4,764,237 | 8/1988 | Shishkin et al. | 264/269 |
| 4,810,453 | 3/1989 | Clarke et al. | 264/269 |

FOREIGN PATENT DOCUMENTS 4226 7/1987 WIPO ........................... 156/287

Primary Examiner—Michael W. Ball
Assistant Examiner—Steven D. Maki
Attorney, Agent, or Firm—Woodard, Emhardt, Naughton, Moriarty & McNett

[57] ABSTRACT

An underground pipeline or passageway is lined by having a plastics film pre-liner tube applied thereto by inflation, and the tube whilst inflated has an applicator pulled therethrough from which a fluent curable or hardenable composition issues and is applied directly to the inside of the inflated tube to form a layer which cures or hardens to form a lining. Preferably a second tube is applied to the inside of the composition layer to hold it in position whilst it cures or hardens.

6 Claims, 1 Drawing Sheet

LINING OF PASSAGEWAYS

This invention relates to the lining of pipelines and passageways, especially the lining of underground pipelines and passageways for the rehabilitation, improvement, repair or change of use or coating of such pipelines or passageways.

There are now established a number of techniques for the lining of pipelines and passageways, and these techniques are to a greater or lesser extent successful, and the techniques tend to lend themselves to particular applications. That is to say, some techniques are better for some circumstances, whilst other techniques are better for other circumstances.

For example, there are known cement mortar lining techniques wherein cement mortar is applied directly to the passageway or pipeline surface by spraying, trowelling or by other methods, and such cement mortar lining may be provided with a reinforcement means such as metallic rods, bars or the like. Cement mortar lining techniques are particularly suitable for large pipelines and passageways where man entry is easy, but as the pipeline or passageway reduces in size until man entry is not possible, cement mortar lining is not as appropriate as other techniques, although it is still possible to effect such a lining method by pulling a spraying device through the pipeline or passageway and by spraying the cement mortar material onto the pipeline or passageway surface. Adopting similar methods, it is possible to apply other lining materials to passageway surfaces, such as curable synthetic resinous materials which like cement mortar harden to provide a rigid lining on the pipeline or passageway surface. Such synthetic resinous materials, which are of course curable, may or may not be provided with reinforcement as required. Such reinforcement may comprise fibrous materials such as glass fibre or scrim or felt materials.

Other techniques which are used for pipeline or passageway lining comprise the fabrication of a flexible lining tube which embodies an absorbent layer or layers, and such layer or layers is or are impregnated thoroughly with a curable synthetic resin at ground level, and then the impregnated bag is fed into the pipeline or passageway before the resin cures, and is held to the surface thereof by fluid pressure until the resin cures forming a rigid lining pipe inside the existing pipeline or passageway. These techniques are particularly suitable for the lining of pipelines or passageways which are of the smaller non-man entry size, although they can be used for man entry pipelines and passageways if required.

Other techniques involve the feeding directly into the pipeline or passageway of semi-rigid plastic pipes of smaller size than the pipeline or passageway, followed by the filling of the space between the pipeline or passageway and the rigid pipe with a grouting material.

The present invention is concerned with a pipeline or passageway lining method Wherein a fluent composition such as cement mortar or a curable resin or the like is sprayed or in suitable circumstances otherwise applied to the pipeline or passageway surface so as to form in effect a pipe of such fluent material (when it has cured or hardened) lying inside the existing pipeline or passageway to form a lining for same.

One of the difficulties which arises in connection with the techniques referred to above wherein a fluent composition is applied to the pipeline or passageway surface is that the composition will tend to anchor to the pipeline or passageway surface on the one hand, and on the other hand, where the pipeline or passageway surface has crevices or recesses, the fluent material will tend to flow into such crevices or recesses and at these locations there will not be an even layer of the cured material because at such locations, the cured material would tend to follow the contour of the crevice or recess. At such location there will inevitably be a potential weakness point in the lining at best, or cracks or holes in the lining at worst.

There is already known from U.S. Pat. No 4,456,401 a passageway lining method wherein a plastic liner tube is applied to the passageway surface. The plastic lining tube is provided with a felt which lies to the inner surface of the liner tube and finally the felt is impregnated with curable synthetic resin by a squeegee system. A further plastic tube is everted into the passageway by heated water so as to apply a uniform pressure to the resin impregnated felt to hold the resin in place and to initiate the curing of same. The use of a felt and a squeegee makes this process difficult to perform. There is reference to spraying the resin onto the felt tube, but no specific details of such process are given.

Also, there are known from European Patent No 0228998 various methods for lining an underground passageway wherein a lining tube assembly comprising an inner plastic tube, a felt tube impregnated with curable resin and an outer plastic film, is pre-manufactured and then is inserted in the passageway and inflated into the passageway surface, and the resin is cured so that a hard lining pipe is formed. These methods suffer from the disadvantage that the assembly has a felt tube which is pre-impregnated with the curable material, and a special impregnation plant is required.

The present invention aims to overcome difficulties with prior methods and in accordance with the present invention the method of lining a pipeline or passageway comprises placing in said pipeline or passageway a "pre-liner" tube of a construction so that the tube can be inflated, followed by inflation of the tube on to the pipeline or passageway surface, followed by the spraying onto the inner surface of the inflated pre-liner of the fluent composition to form a layer of such composition on the inner surface of the inflated pre-liner which subsequently cures or is cured to form a rigid pipe of said composition on the pipeline or passageway surface, the said pre-liner tube being inflated by means of a gaseous medium enabling a spraying device to be displaced along the inflated pre-liner tube for the application of said fluent composition to said surface, characterised in that the "pre-liner" tube is a plastics material film and the composition is sprayed directly onto the film surface.

The fluent composition may be supplied with a mixture of dry cementitious powder, and water, these ingredients being supplied from different sources, and mixing in the vicinity of the spraying apparatus or indeed on the inner surface of the inflated pre-liner tube.

Preferably however, the fluent composition will be a cement mortar material or more preferaly a synthetic resinous composition which is curable and which preferably contains reinforcement fibres in the form of glass fibres.

The fluent composition will preferably be of a viscosity so that it will remain as a coherent and preferably even thickness layer on the inflated pre-liner inner surface, but if necessary in order to keep the composition in place whilst it is cured or cures, after the application of the composition there may be everted into the pipeline or passageway a further holding-tube of suitable plastics material which lies to the inside of the applied composition and holds same in position whilst the curing takes place.

The invention provides a number of advantages including that the pre-liner prevents the loss of the composition into cracks, fissures and recesses in the pipeline or passageway surface, as the pre-liner tube will bridge these imperfections.

Secondly, the pre-liner tube will form a slip plane between the pipeliner or passageway surface and the surface of the rigid pipe formed by the cured composition so that if there is any ground movement giving rise to relative movements of different sections of the pipeline or passageway surface, such relative movements will either not be transferred to the rigid composition pipe or will not be transmitted to this pipe to the same extent so that it will not be as liable to fracture in such circumstances as would be a composition pipe created by direct application of the fluent composition to the pipeline or passageway surface. The formation of cracks in conventionally applied cured composition pipes represents a major disadvantage of cement mortar and the like lining techniques and therefore the present invention represents a considerable advance in the art.

An embodiment of the present invention will now be described, by way of example, with reference to the accompanying diagrammatic drawings, wherein.

Figure 1:
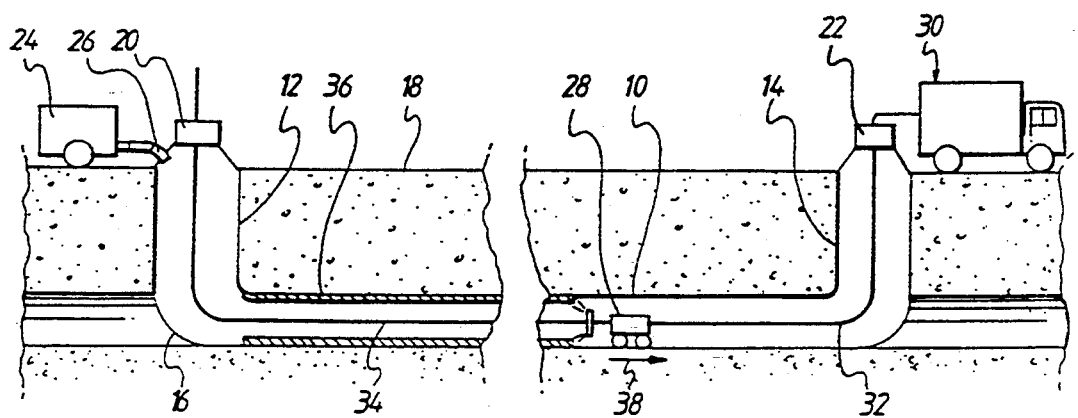
FIG. 1 is a diagrammatic side elevation illustrating the process in operation.

Referring to the drawings, an underground pipeline or passageway (10) is shown as being lined in accordance with the method according to the embodiment of the invention.

The passageway (10) extends between two manholes (12) and (14) which are used for access in the lining operation.

A pre-liner tube (16) is fed into and along the passageway (10) from one manhole to the other by conventional means, and the ends of the pre-liner tube are taken to the level (18) of the ground. The ends are sealed by sealing members (20) and (22) so that the interior of the pre-liner tube (16) forms an envelope which can be and is inflated by an air-compressor (24) at ground level which is coupled to the interior of the tube (16) through suitable valve and pipe arrangement (26).

Before the tube (16) is thus inflated, a spraying device (28) which can be moved through the passageway whilst the tube is inflated, is positioned inside the tube (16), and the device (28) is connected to a ground level vehicle (30) from which the supply of the fluent composition to form the lining is supplied through a supply tube (32) which sealingly passes through the sealing member (22). The vehicle also preferably contains a winching device whereby the spray head on machine (28) can be pulled along the interior of the inflated tube (16) in passageway (10). A rope (34) is also connected to the device (28), and extends upwardly through the manhole (12) and through the sealing member as shown.

With the arrangement as shown in FIG. 1, the spray device (28) is initially positioned at the left hand end of passageway (10), and it is progressively pulled along the passageway (10) through the pressurised and inflated tube (16), spraying the fluent composition directly onto the interior of the pre-liner tube (12) as shown at (36) as the spray-head proceeds in the direction of arrow (38). The speed of the spraying device and the quantity of the fluent composition (36) being sprayed therefrom are calculated so as to provide a layer of the material (36) on the inner surface of the pre-liner tube (16) of the required thickness.

As stated herein, the fluent composition may be any suitable, for example, a two-part polyurethane or epoxy resin, or a cementitious material. The fluent composition may be reinforced by means of for example glass fibres or the like.

Where a resinous material is used it is preferred that the cure time should be as short as possible, and in this case it is preferred that where a two-part resin system is used, the resin parts are mixed only in the spray device (28) so that they will cure or commence cure very soon after mixing and application to the inner surface of the lining tube (16). The tube (16) is constructed of suitable plastics material such as polyurethane or pvc.

Figure 2:
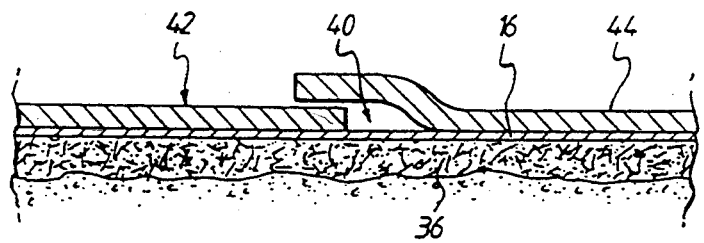
FIG. 2 is an enlarged sectional elevation illustrating a section of the underground pipeline shown in FIG. 1 in the region of a pipe joint, for the purposes of explaining the main advantages of the present invention.

FIG. 2 shows how the tube (16) functions with advantage. The tube (16) is shown as bridging a pipe-joint gap (40) in FIG. 2, the fluent material (36) forming in fact a rigid pipe on the inner surface of the lining tube (16) also being shown. Assuming that FIG. 2 shows the finished product, two main advantages are that the fluent material (36) has been prevented from entering the space (40) as it would have done were the tube (16) omitted, and any such penetration of the space (40) would have resulted in a corresponding groove or recess in the inner surface of the resulting pipe (36) and possibly a weak point in the pipe (36) or even a leakage point therein.

Secondly, by using the film (36) the pipe is prevented from bonding to the pipe sections (42), (44), defining the passageway so that if in fact ground movement takes place so that the pipe sections (42) and (44) are relatively displaced, the tensile forces which normally would have been transmitted to the pipe (36) were it bonded directly to pipe sections (42) and (44), are avoided and fracture of the pipe (36) is therefore avoided.

Figure 3:
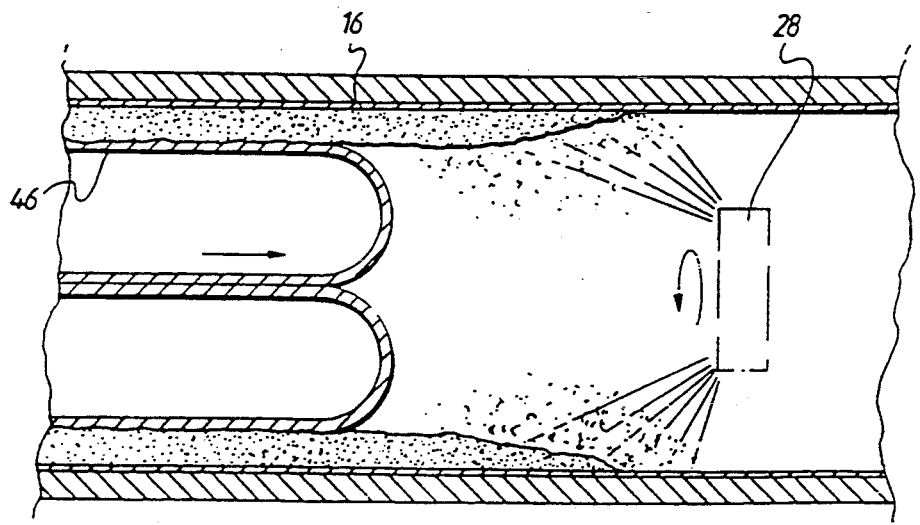
FIG. 3 is an enlarged view similar to FIG. 2, showing how a holding tube may be used for holding the curable composition in place, whilst curing is effected.

In the arrangement of FIG. 3, a second tube or flexible material similar to tube (16) and forming a holding tube (46) is everted onto the fluent composition immediately after it has been sprayed onto the inner surface of the tube (16). This technique may be useful when some additional holding force is required to keep the fluent composition in place until it cures, but it is preferred that a fluent composition of sufficient viscosity be used so that it will be self-supporting even before curing and until curing takes place. The holding tube may alternatively comprise a laminate of a fibrous felt having an impermeable outer layer.

Preferably a fluent composition which cures at ambient temperature is utilised, but it is possible to use materials which require the application of heat, in which case hot inflation medium would require to be introduced into the tube (16) so that heat will be applied to the fluent composition immediately after its application to effect or commence the curing thereof.

Although the thickness of the fluent composition which is applied to the pre-lining tube may be any suitable, it is preferred that it should be of such thickness so that the resulting cured pipe is able to withstand ground movement and will also be able to withstand the expected hydraulic or ground loadings which will be experienced.

The pre-liner tube and the holding tube may be reinforced if required with high strength material such as glass fibre or Kevlar fibre, to enhance the tensile properties thereof.

What is claimed is:

1. A method of lining a pipeline or passageway, comprising the steps of:
   a) locating a spraying device inside a pre-liner tube of plastic film;
   b) inflating said pre-liner tube onto the inner surface of the pipeline or passageway with a gaseous medium;
   c) while holding the pre-liner tube against the inner surface of the pipeline or passageway with the gaseous medium, moving the spraying device along the pipeline or passageway and spraying a curable fluent composition from the spraying device directly onto the plastic film to form a tubular layer of said composition on the inner surface of the pre-liner tube; and
   d) curing the tubular layer of said composition to form a rigid pipe on the inner surface of the pre-liner tube;
   wherein the pre-liner tube is not bonded to the inner surface of the pipeline or passageway so that the pre-liner tube forms a slip plane between the pipeline or passageway and the rigid pipe.

2. A method according to claim 1, wherein the fluent composition comprises a mixture of dry cementitious powder and water, the method including the further steps of supplying the cementitious powder and water separately to the spraying device and either mixing the dry cementitious powder and water in the spraying device or on the inner surface of the pre-liner tube.

3. A method according to claim 1, wherein the fluent composition is a cement mortar material or a synthetic resin including reinforcement fibres in the form of glass fibres.

4. A method according to claim 1, wherein after the spraying of the composition there is everted into the pipeline or passageway a further holding tube to hold the composition in position whilst the curing takes place.

5. A method according to claim 4, wherein the holding tube comprises a fibrous felt having an impermeable outer layer.

6. The method according to claim 1, wherein the pre-liner tube is inflated onto the inner surface of an underground passageway.

* * * * *

UNITED STATES PATENT AND TRADEMARK OFFICE
CERTIFICATE OF CORRECTION

PATENT NO. : 5,409,561
DATED : April 25, 1995
INVENTOR(S) : Eric Wood

It is certified that error appears in the above-indentified patent and that said Letters Patent is hereby corrected as shown below:

On the title page:

In place of "[22] Filed: July 6, 1993" substitute

--[22] PCT Filed:     Nov. 6, 1991

[86] PCT No.:       PCT/GB91/01947

§371 Date:     July 6, 1993

§102(e) Date:  July 6, 1993

[87] PCT Pub. No.:  WO92/08921

PCT Pub. Date: May 29, 1992 --

Signed and Sealed this

Fifth Day of September, 1995

Attest:

BRUCE LEHMAN

*Attesting Officer*    *Commissioner of Patents and Trademarks*